Oct. 7, 1952

H. J. EVANS 2,612,781

THERMORESPONSIVE COUPLING FOR DIFFERENTIAL
PRESSURE REGISTERING MECHANISM

Filed July 9, 1946

INVENTOR.

HOWARD J. EVANS

BY

Stranch & Hoffman

Patented Oct. 7, 1952

2,612,781

UNITED STATES PATENT OFFICE 2,612,781

THERMORESPONSIVE COUPLING FOR DIFFERENTIAL PRESSURE REGISTERING MECHANISM

Howard J. Evans, Export, Pa., assignor to Rockwell Manufacturing Company, Pittsburgh, Pa., a corporation of Pennsylvania Application July 9, 1946, Serial No. 682,331

4 Claims. (Cl. 73—393)

This invention relates to means for operating the differential pressure registering or recording means of an orifice meter.

In fluid meters of the orifice type, for the purpose of measuring differential pressures, it is the general practice to connect the high pressure fluid line with a casing or chamber, usually of U-shaped form, which contains a liquid column, preferably mercury. Varying pressures of the fluid being metered on one end of this liquid column cause corresponding fluctuations of the surface level of the liquid at the opposite end of the column. These movements of the liquid column and variations in surface level are recorded on a moving chart by a marking pen connected by mechanical motion transmitting means to a float on the surface of the liquid column. However, in the absence of an effective compensating means in the motion transmitting mechanism, it is apparent that alterations in the volume of the liquid column, due to ambient temperature changes, will be accompanied by other fluctuations of the surface level of the column than those caused by differential fluid pressures, and will likewise be transmitted through said connections to the recording mechanism, resulting in the introduction of errors on the record. It is the purpose of an orifice meter to accurately measure the difference between two existing fluid pressures; it is therefore essential, to neutralize any extraneous influences which might adversely affect the accuracy of measurement of the true pressure differential.

The effective compensation of these vagrant changes in surface level of the liquid column, due solely to variations of ambient temperature, in the transmission of motion to the registering mechanism, requires the consideration of several factors, as the accuracy of measurement is primarily controlled only by the rise or fall of the liquid level. Therefore, the shape of the float chamber becomes important since any alteration thereof from a uniform cross-section will affect the increment of vertical change of liquid level for any unit of thermal variation. Also, the difference between the coefficients of expansion of the material of which said chamber is made, and that of the liquid must be known, as it is only this difference which is effective to alter the liquid level. Further, the means employed to compensate for the affect of ambient temperature changes on the liquid must be so arranged in the motion transmitting connections as to respond rapidly to all such changes, while at the same time it must not offer any appreciable resistance to the smooth operation of said connections through which movement is transmitted to the registering or recording device.

With the above considerations in mind, it is the primary object and purpose of the present invention to provide a simple, durable, inexpensive and sensitively operable thermo-responsive coupling in the motion transmitting connections between the liqud column and the registering or recording mechanism of an orifice meter which will effectively compensate for any vertical movement of the surface of the mercury or other liquid column which is due to ambient temperature changes.

Another object of the invention resides in the provision of a bi-metallic element with novel connecting means between said float, and the motion transmitting rod or stem, whereby all vertical components of movement resulting from thermal expansion and contraction of the float supporting fluid are smoothly neutralized in consonance with the rise and fall of the liquid level.

An additional object of the invention is to provide coupling means as above characterized which will neutralize the effects of thermal expansion or contraction of the mercury column upon the vertical movement of the float buoyantly supported by the mercury column.

With the above and other objects in view, the invention comprises the improved thermo-responsive coupling for a meter register and the construction and relative arrangement of its several parts, as will hereinafter be more fully described, illustrated in the accompanying drawings, and subsequently incorporated in the subjoined claims.

In the drawings, wherein I have disclosed several simple and practical embodiments of the invention, and in which similar reference characters designate corresponding parts throughout the several views.

Figures 1, 2, 3:
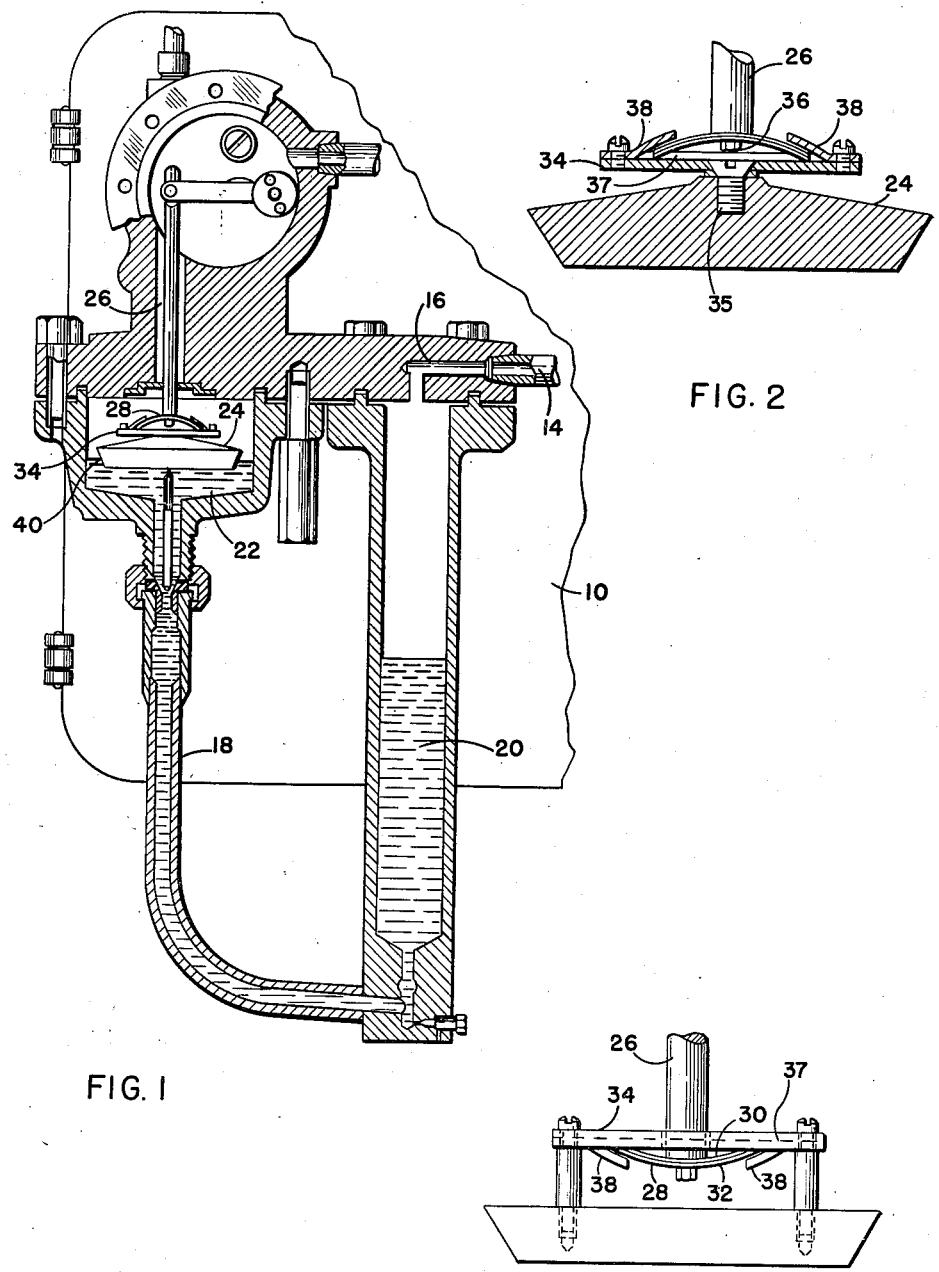
Figure 1 is a general assembly view of the register operating means of an orifice meter embodying the present invention.
Figure 2 is a fragmentary vertical section on an enlarged scale, illustrating one embodiment of my improved thermo-responsive coupling in one arrangement thereof in the motion transmitting connections for the register operating mechanism.
Figure 3 is a view similar to Figure 2 showing an alternative arrangement of the bimetallic element in the motion transmitting connections.

Referring in further detail to the drawings, in Figure 1 thereof, a conventional type of orifice meter is generally indicated at 10, having associated therewith a suitable registering or recording device. The high pressure fluid line 14 of the meter is connected by conduit 16 with a U-shaped chamber or casing 18 containing a column of liquid, preferably mercury, indicated at 20. One end of the casing 18 is connected to a float compartment 22 of uniform diameter, and it will be apparent that any variation of fluid pressure on one end of the mercury column will cause corresponding fluctuations of the surface level at the other end of said column.

A metallic float 24 is buoyantly supported by the end of the mercury column within compartment 22 and a motion transmitting rod or stem 26 is suitably connected at its upper end through an intermediate operating mechanism, with the pen or other scribing instrument of a register (not shown). Instead of rigidly attaching the stem 26 at its lower end to float 24, in accordance with the present invention a thermo-responsive coupling is interposed between said stem and the float. This coupling comprises a bimetallic element 28 consisting of two arcuately curved strips 30 and 32 respectively, of different metals, suitably secured together at their contacting surfaces in superimposed relation.

To the top of the float 24 at its center a horizontal bar 34 is rigidly secured by screw 35 and has its ends equidistantly spaced from the axial center of float 24 and stem 26. The bimetallic element 28 is centrally provided with an opening to receive a stud 36 on the stem 26 and has its convex surface in contact with the lower end face of the stem. The opposite ends of element 28 are positioned in a channel 37 in the upper surface of bar 34 and beneath guide clips 38 rigidly secured to each end of said bar. By means of this construction, each end of the element 28 may have a slight horizontal movement, occasioned by changing curvature of said element, but is constrained against any vertical motion independently of the bar 34 and float 24. Actually the weight of stem 26 is sufficient to preclude any vertical movement of element 28 with respect to bar 34. The degree of vertical movement of the ends of the coupling element, in response to thermal expansion and contraction is predetermined by the arc radius of said element and the proper selection of the metals used for the separate strips 30 and 32. It will be apparent that these strips should be made of the required selected metals to produce the necessary degree of compensating movement of the coupling element corresponding to the range of ambient temperature variations and the character of the float supporting fluid used.

It will be apparent from the above description that with a properly selected bimetallic coupling element correctly interposed between and connected with the float and stem, a compensating opposite or neutralizing movement of said coupling element occurs in proportionate ratio to any vertical movement of the surface of the mercury column, which is caused by change in ambient temperature modifying the volume of the mercury column on which the float is buoyantly supported. The vertical movement of coupling element 28 is of course reflected in a corresponding movement of float 24 relative to stem 26, but in an opposite direction to the movement of the surface 40 of the mercury column.

The total vertical movement which must be neutralized by the coupling is of course the extent of the combined rise and fall of the surface level of the mercury 20, due to temperature variations from a predetermined norm.

The extent of this fluctuation will depend on the coefficient of expansion of the mercury, the shape of compartment 22, and the coefficient of expansion of the metal from which the container or casing for the mercury column is constructed. Of course the coefficients of expansion of different metals may be readily ascertained from reference to standard engineering handbooks. With these values known, substitution in the formula $$Bm - Bc = \frac{\Delta V}{V_o} \cdot \frac{1}{t}$$

where
$Bm$ = coef. of exp. of mercury
$Bc$ = coef. of exp. of container metal
$V_o$ = original volume of mercury and container
$\Delta V$ = effective change in volume of mercury
$t$ = change in temperature in degrees C.

will give a sufficiently close approximation of the effective change in volume of the mercury from which may be calculated its vertical movement due to ambient temperature change. Assuming that the compartment 22 is uniformly cylindrical for any vertical distance through which the surface 40 will move, the extent of this movement can be calculated by use of the general formula $$\Delta V = \pi r^2 h$$

where
$V$ is the effective change in volume of the mercury
$\pi = 3.1416$
$r$ = radius of cylindrical container
$h$ = vertical distance mercury will rise or fall In selecting the metals which form the strips 30 and 32 of the bimetallic coupling element, the required range of vertical movement must be considered. It is also essential that such metals be selected as will be inert to mercury and the fluids to be metered. The required cooperative response to thermal change of the selected metals for strips 30 and 32 to produce a vertical movement at the ends of the coupling element in proportionate ratio to any reasonable range of ambient temperature change can be determined from the formula $$R = \frac{d}{(A_x - A_y)t}$$

where
$R$ is the radius of curvature of the bent strips
$d$ is substantially one half the thickness of the bimetallic element
$A_x$ is the coef. of exp. of one metal strip
$A_y$ is the coef. of exp. of the other metal strip
$t$ is the change in temperature in degrees C.

With reference to Figure 3 of the drawings, it will be seen that the bimetallic element 28 may be so arranged and coupled with the float 24 that in response to decrease of temperature, it will expand or straighten instead of contracting as in Figure 2, and operate to compensate for the change in surface level of the mercury column, in the manner above described.

As the bimetallic coupling element is coupled to the float in such manner as to immediately and sensitively respond to any change in temperature of the mercury, its neutralizing action, preventing transmission of any movement of the float resulting from ambient temperature changes through stem 26 to the registering device, will be rapid and complete. Practical experiments have shown that there is a noticeable difference in accuracy between the record produced by a compensated and a non-compensated measuring mechanism respectively, and that the present invention represents a marked improvement in the registering accuracy of orifice type fluid meters.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In an orifice type fluid meter having a casing containing a liquid column subject at each end to different fluid pressures; means responsive to movements of said liquid column to transmit movement to a differential pressure registering instrument, said means comprising a member buoyantly supported by one end of the liquid column, a motion transmitting member, a thermo-responsive coupling element having a fixed connection to one of said members, and means slidably connecting said element to the other of said members and cooperating with said element upon movement of the liquid column in response to differential pressures to impart a straight line axial movement to said motion transmitting member, said element in response to thermal variations slidably moving relative to said connecting means to prevent the transmission of movement by the coupling element to said motion transmitting member upon variation in volume of the liquid column resulting from ambient temperature changes.

2. The combination as defined by claim 1, wherein said thermo-responsive coupling comprises an elongated, arcuately curved bi-metallic element slidably coacting at each of its ends with said connecting means.

3. In an orifice type fluid meter having a casing containing a liquid column subject at each end to different fluid pressures; means responsive to movement of said liquid column to transmit movement to a differential pressure registering instrument, said means comprising a member buoyantly supported by one end of said liquid column, a motion transmitting member guided for axial movement, a thermo-responsive coupling element having a fixed central connection to one of said members, and means connecting said element to the other of said members and cooperating with said element upon movement of the liquid column in response to variations in differential pressure to impart axial movement to said motion transmitting member, the connection formed by said connecting means being symmetrically disposed relative to said central connection, movable radially relative to the line of axial movement of said members, and including means preventing movement of the connection in the direction of such axial movement, said element, in response to thermal variations, varying the axial distance between said connection and said connecting means to prevent transmission of movement by the coupling element to said motion transmitting member upon variation of the volume of the liquid column resulting from ambient temperature changes by compensating for the movement of the buoyantly supported member.

4. In an orifice type fluid meter having a casing containing a liquid column subject at each end to different fluid pressures; means responsive to movements of said liquid column to transmit movement to a differential pressure registering instrument, said means comprising a member buoyantly supported by one end of the liquid column, a motion transmitting member guided for axial movement, an elongated bimetallic strip having a connection centrally of its length to one of said members, and having connections to the other of said members which are equidistant along said element from said first connection, and which are disposed on opposite sides of said first connection, said connections being movable radially relative to the line of axial movement of said members and including means preventing movement of said connections in the direction of such axial movement, whereby movement of the liquid column in response to differential pressure will impart a straight line axial movement to said motion transmitting member, said bimetallic strip in response to thermal variations producing relative motion between said first connection and said second connections axially of said members to prevent the transmission of movement by the bimetallic strip to said motion transmitting member upon variation in volume of the liquid column resulting from ambient temperature changes.

HOWARD J. EVANS.

REFERENCES CITED

The following references are of record in the file of this patent:

UNITED STATES PATENTS

| Number | Name | Date |
| --- | --- | --- |
| 1,096,228 | Delaney | May 12, 1914 |
| 1,922,194 | Brown et al. | Aug. 15, 1933 |
| 1,930,899 | Kollsman | Oct. 17, 1933 |

FOREIGN PATENTS

| Number | Country | Date |
| --- | --- | --- |
| 24,370 | Great Britain | Oct. 23, 1909 |
| 559,336 | France | June 14, 1923 |